United States Patent
Yu et al.

(10) Patent No.: US 8,141,891 B2
(45) Date of Patent: Mar. 27, 2012

(54) FRICTION CONTROL APPARATUS FOR VEHICLE SUSPENSION

(75) Inventors: Jinghong Yu, Dublin, OH (US); James W. Post, II, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 424 days.

(21) Appl. No.: 12/533,705

(22) Filed: Jul. 31, 2009

(65) Prior Publication Data

US 2011/0024999 A1 Feb. 3, 2011

(51) Int. Cl.
*B60G 9/02* (2006.01)

(52) U.S. Cl. .... 280/124.134; 280/124.125; 280/124.145

(58) Field of Classification Search ........... 280/124.127, 280/124.134, 124.135, 124.145, 124.125, 280/124.1

See application file for complete search history.

(56) References Cited

U.S. PATENT DOCUMENTS

| | | | | |
|---|---|---|---|---|
| 3,137,513 A | * | 6/1964 | Marot | 280/124.103 |
| 4,159,128 A | * | 6/1979 | Blaine | 280/5.521 |
| 4,354,567 A | * | 10/1982 | Puchas | 180/358 |
| 4,844,505 A | * | 7/1989 | Higuchi | 280/124.145 |
| 4,911,466 A | * | 3/1990 | Blair | 280/124.146 |
| 5,284,353 A | * | 2/1994 | Shinji et al. | 280/86.751 |
| 5,286,052 A | * | 2/1994 | Lukianov | 280/124.134 |
| 5,346,241 A | | 9/1994 | Lee | |
| 5,380,035 A | * | 1/1995 | Lee | 280/124.143 |
| 5,415,426 A | | 5/1995 | Strasser | |
| 5,431,429 A | * | 7/1995 | Lee | 280/124.139 |
| 5,435,591 A | | 7/1995 | Lee | |
| 5,451,073 A | * | 9/1995 | Inoue | 280/124.145 |
| 5,498,019 A | * | 3/1996 | Adato | 280/124.136 |
| 5,560,590 A | | 10/1996 | Reast | |
| 5,782,484 A | * | 7/1998 | Kuhn, Jr. | 280/124.142 |
| 6,003,886 A | * | 12/1999 | Kiesel | 280/86.757 |
| 6,039,337 A | * | 3/2000 | Urbach | 280/124.134 |
| 6,092,614 A | * | 7/2000 | Shin | 180/2.2 |
| 6,193,251 B1 | * | 2/2001 | Jung | 280/124.146 |
| 6,305,700 B1 | * | 10/2001 | Bruehl | 280/124.135 |
| 6,726,229 B2 | | 4/2004 | Smith et al. | |
| 6,793,228 B2 | * | 9/2004 | Zadok | 280/124.134 |
| 7,115,067 B2 | * | 10/2006 | Tashiro | 477/83 |
| 7,185,902 B1 | * | 3/2007 | Lloyd | 280/124.106 |
| 7,222,863 B2 | * | 5/2007 | Deal et al. | 280/5.521 |
| 7,281,716 B2 | * | 10/2007 | Fanson | 280/5.52 |
| 7,377,522 B2 | * | 5/2008 | MacIsaac | 280/5.507 |
| 7,628,414 B2 | * | 12/2009 | Dobson et al. | 280/124.106 |
| 7,712,748 B2 | * | 5/2010 | Deal et al. | 280/5.521 |

(Continued)

FOREIGN PATENT DOCUMENTS

EP 503371 A1 * 9/1992

(Continued)

*Primary Examiner* — Paul N Dickson
*Assistant Examiner* — Nicole Verley
(74) *Attorney, Agent, or Firm* — Rankin Hill & Clark LLP

(57) ABSTRACT

A vehicle suspension friction control apparatus includes a first link having a first end and a second end, and a second link having a first end and a second end. The first end of the first link is mounted to one of a steering knuckle or a lower control arm connected to a lower part of the steering knuckle. The first end of the second link is mounted to the other of the steering knuckle or the lower control arm. A friction control joint connects the second end of the first link and the second end of the second link for controlling friction between the steering knuckle and the lower control arm.

23 Claims, 3 Drawing Sheets

U.S. PATENT DOCUMENTS

| | | | |
|---|---|---|---|
| 7,766,344 B2 * | 8/2010 | Buma | 280/5.511 |
| 7,784,805 B2 * | 8/2010 | Morgan | 280/124.134 |
| 7,793,946 B2 * | 9/2010 | Vaxelaire | 280/5.521 |
| 7,798,506 B2 * | 9/2010 | LeBlanc et al. | 280/124.135 |
| 2004/0046350 A1 * | 3/2004 | Wagner et al. | 280/124.135 |
| 2005/0280240 A1 * | 12/2005 | Lemineur et al. | 280/124.134 |
| 2006/0244235 A1 * | 11/2006 | Kusaka et al. | 280/124.136 |

FOREIGN PATENT DOCUMENTS

| | | | |
|---|---|---|---|
| JP | 02249713 A | * | 10/1990 |
| JP | 03186410 A | * | 8/1991 |
| JP | 03213412 A | * | 9/1991 |

\* cited by examiner

FRICTION CONTROL APPARATUS FOR VEHICLE SUSPENSION

BACKGROUND

The present disclosure generally relates to vehicle suspensions, and more particularly relates to a friction control apparatus for a vehicle suspension.

Friction in vehicle chassis systems can be a positive element helpful for improving vehicle robustness to biased input to the vehicle, such as canted road profile, road disturbance, and asymmetric torque input to the right or left wheels. However, excessive friction can have significant negative influence on the dynamic feel of the vehicle during normal driving and road conditions. The simplest way to add friction to a vehicle chassis system is to apply a high-level friction joint or friction control unit to one or more existing mechanical joints in the chassis. A drawback of this approach is that most of the existing joints in the chassis are particularly designed to deal with significant loads. Manipulating these joints could adversely affect the safety of the vehicle because such manipulation could potentially reduce the loading the joint could otherwise handle.

Two general approaches are conventionally used for applying supplemental friction in a vehicle chassis system. In a first approach, which is a more commonly used approach, mechanical friction in the vehicle chassis system are increased, such as suspension strut bearing frictions and steering gear box friction. Unfortunately, this kind of passive and non-controllable friction degrades with time and, of more concern, causes a downgraded steering feel and vehicle performance.

In a second approach, a controllable supplemental friction is applied to the vehicle chassis system such as to a steering column shaft or a steering rack. Examples of such supplemental controllable friction systems and devices are disclosed in JP 2007-083940, JP 2005-104416, and JP 2000-313349, all expressly incorporated herein by reference. Drawbacks of these prior art supplemental controllable friction systems and devices include requiring major design changes to the vehicle steering or suspension system and corresponding increased costs, significant increased energy usage for such systems and/or degrading the desired smooth and pleasant driving feel of the vehicle.

BRIEF DESCRIPTION

According to one aspect, a friction control apparatus is provided for a vehicle suspension. More particularly, in accordance with this aspect, the control apparatus includes a first link having a first end and second end. The first end of the first link is mounted to one of a steering knuckle or a lower control arm connected to a lower part of the steering knuckle. The friction control apparatus further includes a second link having a first end and a second end. The first end of the second link is mounted to the other of the steering knuckle or the lower control arm. A friction controlled joint connects the second end of the first link and the second end of the second link for controlling friction between the steering knuckle and the lower control arm.

According to another aspect, an add-on friction control apparatus is provided for a vehicle suspension. More particularly, in accordance with this aspect, the add-on friction control apparatus includes a first link and a second link. The first link has one end mounted to one of an associated steering knuckle or an associated lower control arm of the steering knuckle. The second link has one end mounted to the other of the associated steering knuckle or the associated lower control arm. A friction controlled joint movably connects opposite ends of the first and second links to each other to control friction between the associated steering knuckle and the associated lower control arm without modifying an associated guide joint between the associated steering knuckle and the associated lower control arm.

According to still another aspect, a vehicle suspension friction control apparatus includes a first link having a first end mounted to a lower control arm of a kingpin strut assembly and a second link having a first end mounted to a knuckle of the kingpin strut assembly. A friction controlled ball joint connects second ends of the first and second links for adding friction between the knuckle and the lower control arm.

According to a further aspect, an add-on friction control apparatus is provided for any existing vehicle suspension. The add-on friction control apparatus provides a suspension device which enables the decoupling of friction control function from a load-taking function of the usual suspension joints so that the safety aspect of the vehicle, particularly as relates to the usual suspension joints, is not affected.

DETAILED DESCRIPTION

Figure 1:
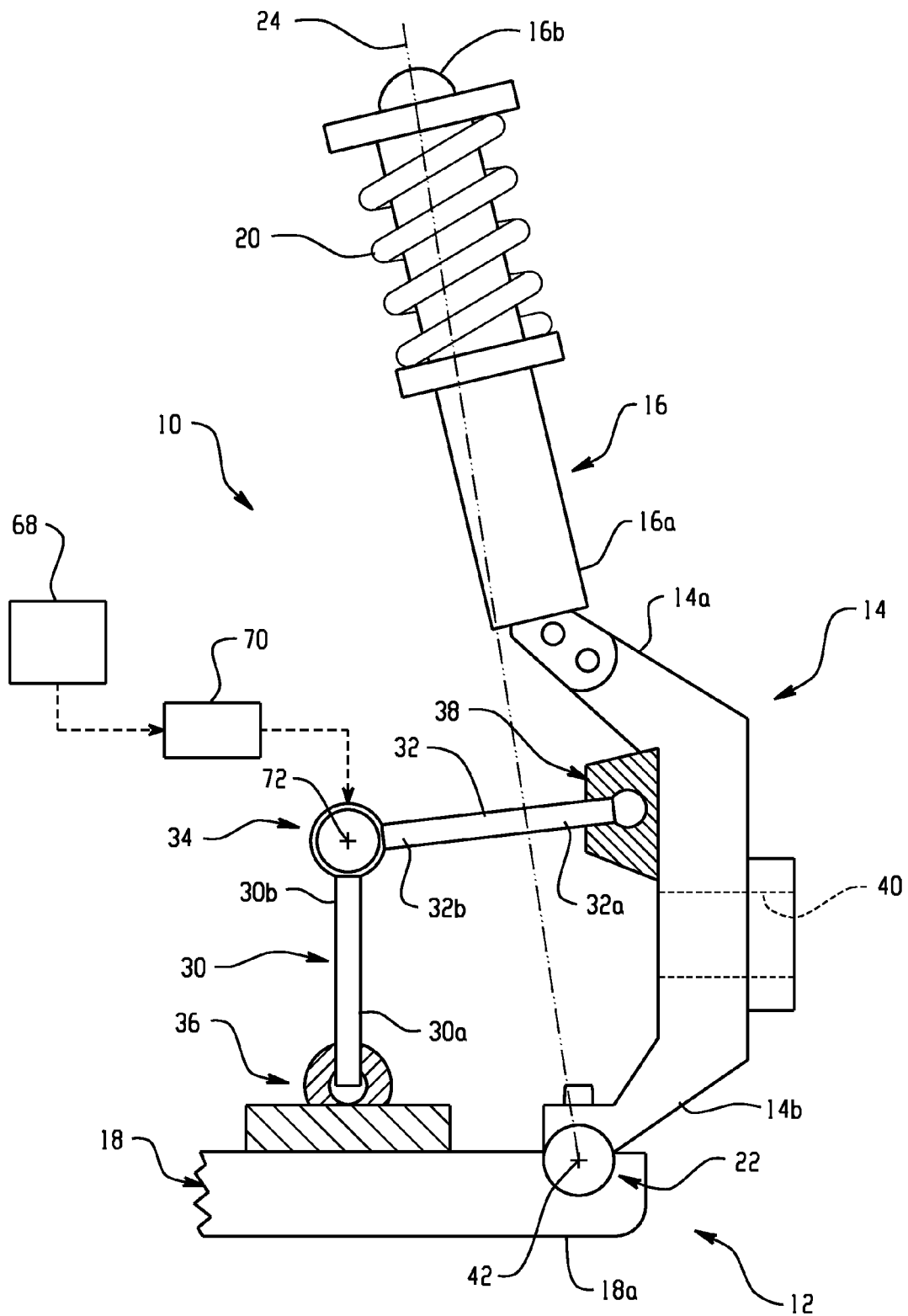
FIG. 1 is a schematic view of a friction control apparatus applied to a vehicle strut suspension system.

Referring now the drawings, wherein the showings are only for purposes of illustrating one or more exemplary embodiments and not for purposes of limiting same, FIG. 1 schematically illustrates an add-on friction control apparatus 10 for a vehicle suspension assembly 12. The suspension assembly 12, which in the illustrated embodiment is a McPherson strut type and can be referred to as a kingpin strut assembly, includes a steering knuckle 14 for rotatably supporting a wheel (not shown), a ride damper 16 connected between an upper part 14a of the knuckle 14 and a part of a vehicle body (not shown), such as a front fender, and a lower control arm 18 connected between a lower part 14b of the knuckle 14 and another part of the vehicle body (also not shown), such as a side frame. A coil spring 20, which surrounds the ride damper 16, is interposed between an intermediate portion of the outer tube of the ride damper 16 and a fixed part of the vehicle body as is known and understood by those skilled in the art. In the illustrated embodiment, the ride damper 16 extends substantially vertically, while the lower control arm 18 extends substantially horizontally. While the illustrated embodiment shows the suspension assembly 12 as a McPherson strut type, it is to be understood and appreciated by those skilled in the art that the suspension assembly could be any type of suspension, such as a double wishbone suspension, for example.

The upper part 14a of the knuckle 14 is connected to lower part 16a of the ride damper 16. The lower part 14b of the knuckle 14 is connected to an outer end 18a of the lower control arm 18 via a ball or guiding joint 22, which can be of a known construction. The wheel attached to the steering knuckle 14 is adapted to be turned by a drive shaft (not shown) which extends laterally with respect to the vehicle body from a transmission (also not shown). As is known, a tie rod (not shown) can be connected to the knuckle 14 for controlling steering of the wheel by the knuckle 14. A kingpin axis 24 is defined by the guiding joint 22 and upper end 16*b* of the ride damper 16 (i.e., in a mounting location of the upper end of the ride damper 20).

The vehicle suspension friction control apparatus 10 includes a first link 30 having one end mounted to one of the steering knuckle 14 or the lower control arm 18 of the steering knuckle 14 and a second link 32 having one end mounted to the other of the steering knuckle 14 or the lower control arm 18. More particularly, first link 30 has a first end 30*a* and a second end 30*b*. The first end 30*a* of the first link 30 is mounted to one of the steering knuckle 14 or the lower control arm 18 connected to the lower part 14*b* of the steering knuckle 14. Likewise, the second link 32 has a first end 32*a* and a second end 32*b*. The first end 32*a* of the second link 32 is mounted to the other of the steering knuckle 14 or the lower control arm 18. In the illustrated embodiment, the first link 30 has its first end 30*a* mounted to the lower control arm 18 of the suspension assembly 12 and the second link 32 has its first end 32*a* mounted to the knuckle 14 of the suspension assembly 12.

The friction control apparatus 10 further includes a friction controlled joint 34 movably connecting the second ends 30*b*, 32*b* of the first and second links 30, 32 to each other to control friction between the steering knuckle 14 and the lower control arm 18 without requiring any modification to the guiding joint 22 interposed between the steering knuckle 14 and the lower control arm 18. In particular, the friction controlled joint 34 connects the second end 30*b* of the first link 30 to the second end 32*b* of the second link 32 for controlling friction between the steering knuckle 14 and the lower control arm 18. In the illustrated embodiment, as will be described in more detail below, the friction controlled joint 34 is a ball joint rotatably connecting the first link 30 and the second link 32, particularly the second ends 30*b*, 32*b* of the links 30, 32, for adding friction between the knuckle 14 and the lower control arm 18. In one embodiment, the friction controlled joint 34 is used as the primary source of friction control between the steering knuckle 14 and the lower control arm 18. As will be described in more detail below, the friction controlled joint 34 has at least one of (i) a fixed friction level or (ii) a controllable friction level, and additionally has one of (i) uniform friction levels in all directions or (ii) varying friction levels in varying directions.

The friction control apparatus 10 further includes a first link joint 36 at the first end 30*a* of the first link 30 connecting the first end 30*a* of the first link 30 to one of the steering knuckle 14 or the lower control arm 18 (e.g., the lower control arm 18 in the illustrated embodiment), and a second link joint 38 at the first end 32*a* of the second link 32 connecting the first end 32*a* of the second link 32 to the other of the steering knuckle 14 or the lower control arm 18 (e.g., the knuckle 14 in the illustrated embodiment). Particular to the illustrated embodiment, the first link joint 36 connects the first end 30*a* of the first link 30 to the lower control arm 18 and the second link joint 38 connects the first end 32*a* of the second link 32 to the steering knuckle 14. In particular, the first link joint 36 connects the first link 30 to the lower control arm 18 at a location spaced apart from the guiding joint 22, which pivotally connects the lower part 14*b* of the knuckle 14 to the lower control arm 18. The second link joint 38 connects the second link 32 to the steering knuckle 14 at the location spaced apart from the guiding joint 22 and spaced apart from an axle shaft aperture 40 defined by the steering knuckle 14.

In an alternate configuration (not shown), the first link 30 could be connected to the knuckle 14 by the first link joint 36 and the second link 32 could be connected to the lower control arm 18 by the second link joint 38. Additionally, the first and second joints 36, 38 could be varied from the illustrated embodiment to allow greater movement (e.g., a width 58 could be increased) and/or additional degrees of freedom (e.g., the second joint 38 could allow translational movement of the second link end 32*a* along the axis x2-x2).

Figure 2:
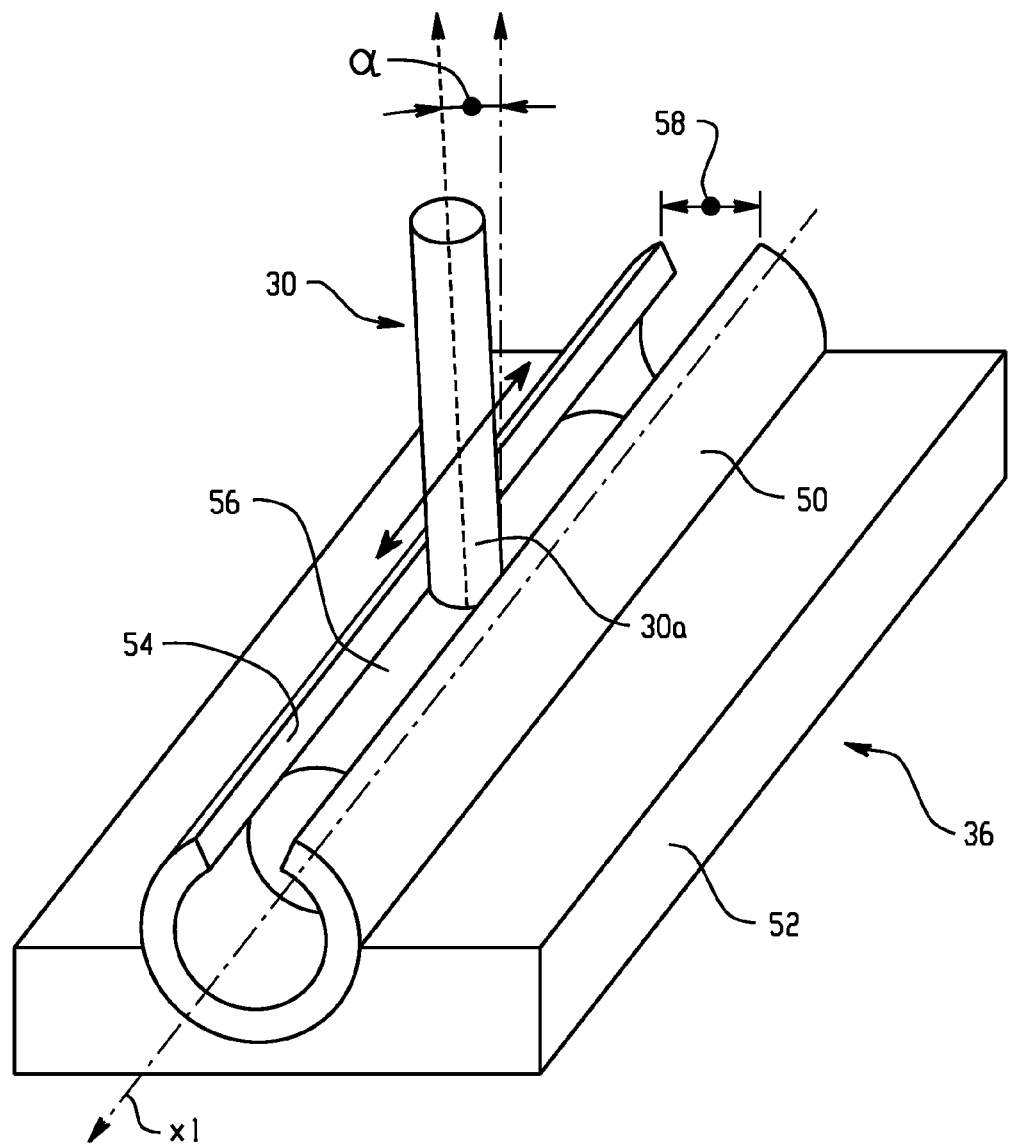
FIG. 2 is a partial perspective view of a first link joint connecting the friction control apparatus to a lower control arm of the strut suspension system.

With additional reference to FIG. 2, the first link joint 36 of the illustrated embodiment is a two-dimensional joint allowing rotational movement about a first axis x1-x1 and translational movement along the same first axis x1-x1. The first axis x1-x1 can be generally parallel to a pivot axis 42 (FIG. 1) of the guiding joint 22 (i.e., an axis about which the guide joint 22 allows relative pivoting movement between the knuckle 14 and the lower control arm 18), one or both of which can be generally parallel to a direction of vehicle travel. In this configuration, the first link joint 36 limits movement of the first link 30 relative to the lower control arm 18 (in the illustrated embodiment) to rotational movement about the first axis x1-x1, which can be generally parallel to pivot axis 42 and/or a direction of the vehicle travel, and to transverse movement along the first axis x1-x1.

As shown, the first joint 36 can include a sleeve 50 fixedly secured to one of the steering knuckle 14 or the lower control arm 18. In the illustrated embodiment, the sleeve 50 is fixedly secured to the lower control arm 18, with an intermediate plate 52 fixedly interposed between the sleeve 50 and the lower control arm 18, though this is not required. The sleeve 50 can be coaxial with the first axis x1-x1 and defines an axial slot 54 through which the first link 30 is received. First link joint 36 also can include a cylindrical member 56 movably disposed within the sleeve 50 and fixedly secured to the first end 30*a* of the first link 30. The cylindrical member 56 is rotatable within the sleeve 50 about the first axis x1-x1 and is slidable within the sleeve 50 along the first axis x1-x1. Rotatable movement of the cylindrical member 56 within the sleeve 50 is limited by the width 58 of the axial slot 54. In particular, the width 58 of the axial slot 54 can be set to allow rotational movement of the cylindrical member 56 and thus the first link 30 to +/−angle α. In particular, the first link 30 received through the axial slot 54 will engage the sleeve 50 and thereby be prevented from further rotating beyond an angle of +/−α.

Figure 3:
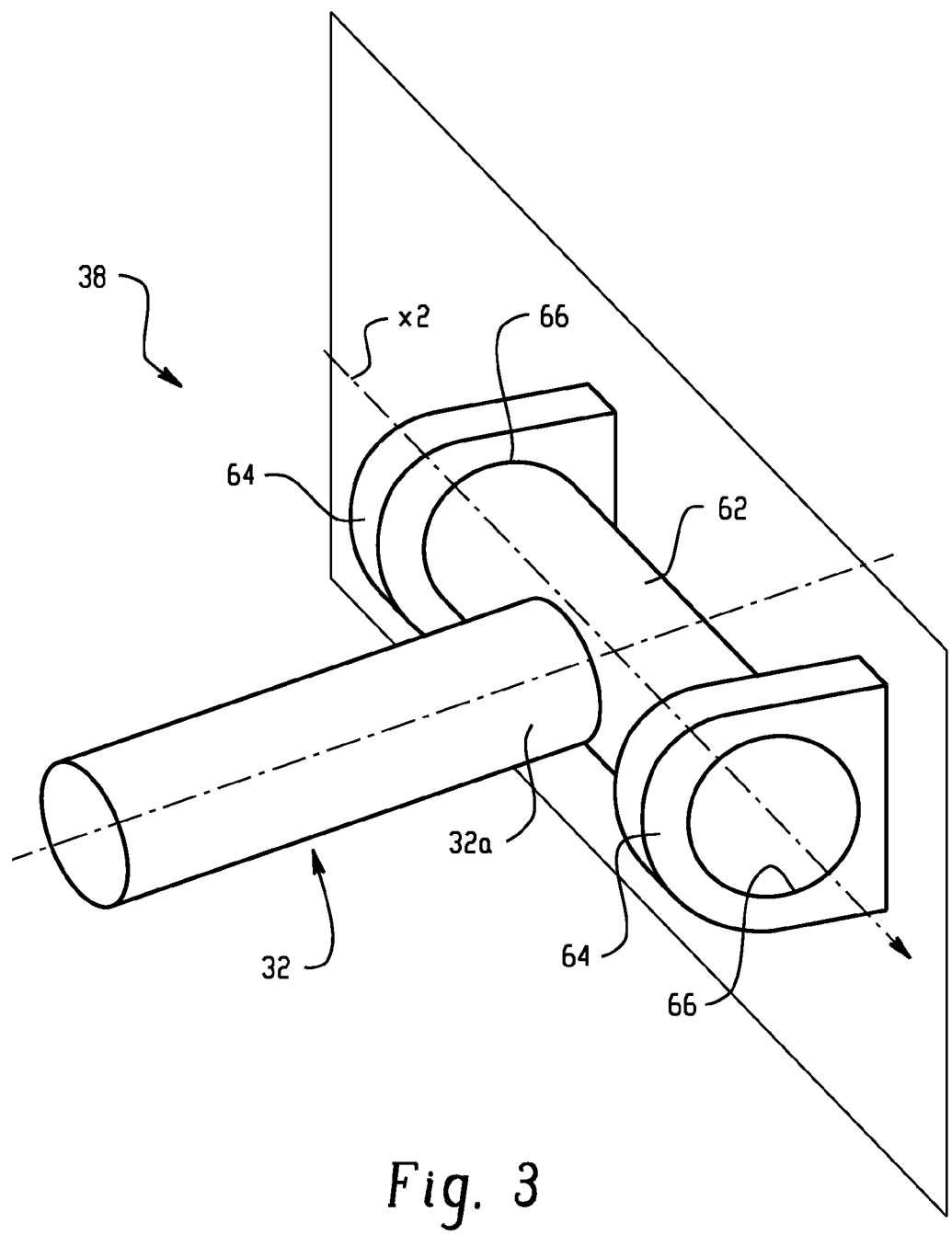
FIG. 3 is a partial perspective view of a second link joint connecting the friction control apparatus to a knuckle of the strut suspension system.

With additional reference to FIG. 3, the second link joint 38 can limit movement of the second link 32 to only rotational movement about a second link joint axis x2-x2, which can also be referred to as a second axis. Thus, the second link joint 38 can be a one dimensional joint allowing only rotational movement about one axis, i.e., the second axis x2-x2. Like the first link joint 36, the second link joint 38 can limit movement of the second link 32 relative to the knuckle 14 when the second link 32 is attached to the knuckle 14 to rotational movement about the second axis x2-x2, which can be generally parallel to a direction of vehicle travel. In addition, the first axis x1-x1 and the second axis x2-x2 can be substantially parallel to one another. In the illustrated embodiment of FIG. 3, the second link joint 38 includes a cylindrical member 62 secured to the first end 32*a* of the second link 32 and at least one collar fixedly secured to the steering knuckle 14 or the lower control arm 18 (i.e., whichever component the second link 32 is connected to). In the illustrated embodiment, the second link joint 38 includes two spaced apart collars 64 fixedly secured to the steering knuckle 14. The cylindrical member 62 is rotatably received in respective apertures 66 defined through the collars 64 for allowing rotational movement of the cylindrical member 62 about the second link joint axis x2-x2, but otherwise preventing relative movement between the second link 32 and the knuckle 14. The first and second link joints 36, 38 can each be substantially friction-free or can have a low level of friction.

As already mentioned, the friction controlled joint 34 between the first and second links 30, 32 can have an adjustable friction level, though this is not required. In particular, with reference back to FIG. 1, the friction controlled joint 34 can have an adjustable friction level controlled by an operatively connected control unit or controller 68. More specifically, the friction control apparatus 10 can further include a hydraulic or electric actuator 70 for selectively adjusting a friction level in the friction controlled joint 34 and the control unit 68 for controlling actuation of the actuator 70. As schematically shown, the actuator 70 can be operatively connected to the friction controlled joint 34 and to the control unit 68. In operation, the control unit 68, through the actuator 70, can control or adjust the friction level in the friction controlled joint 34, when configured to have an adjustable friction level. The control unit 68 can be a standalone control unit or could be integrated with some other controller of the vehicle on which the suspension assembly 12 and friction control apparatus 10 are mounted. In one embodiment, the control unit 68 is integrated with the vehicle's electronic control unit (ECU) and adjusts the friction level of the friction controlled joint 34 via the actuator 70 in response to various driving conditions and operating parameters of the vehicle.

The friction controlled joint 34, particularly when employed as a ball joint, can have either varying or uniform friction levels in the directions of rotation and rocking. In particular, when the joint 34 is a ball joint, it can have a first friction level for relative rotational movement between the first and second links 30, 32, and can have a second friction level for relative rocking movement between the first and second links 30, 32, wherein the first friction level is higher than the second friction level. Alternatively, the second friction level can be set higher than the first friction level. Thus, the first friction level can be set to be responsive to rotatable movement between the links 30, 32 about an axis 72 which can be parallel to one or both the axes x1-x1 and/or x2-x2. The second friction level can correspond to relative rocking movement between the links 30, 32, particularly as the first link 30 has its first end 30a moving along the axis x1-x1.

Advantageously, the add-on friction control apparatus 10 described herein can be applied to any existing vehicle suspension. The friction control apparatus 10 allows friction between the knuckle 14 and the lower control arm 18 to be decoupled from the load-taking function of the guiding joint 22 conventionally disposed between the knuckle 14 and the lower control arm 18. Accordingly, friction between the knuckle 14 and the lower control arm 18 can be controlled without impacting any design parameters relating to the guiding joint 22 thereby increasing the safety aspect of the vehicle on which the suspension assembly 10 is employed.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A friction control apparatus for a vehicle suspension, comprising:
    a first link having a first end and a second end, said first end of the said first link mounted to one of a steering knuckle or a lower control arm connected to a lower part of said steering knuckle;
    a second link having a first end and a second end, said first end of said second link mounted to the other of said steering knuckle or said lower control arm; and
    a friction controlled joint connecting said second end of said first link and said second end of said second link for controlling friction between said steering knuckle and said lower control arm.

2. The friction control apparatus of claim 1 wherein said friction controlled joint has at least one of a fixed friction level or a controllable friction level.

3. The friction control apparatus of claim 2 wherein said friction controlled joint has a controllable friction level and said friction control apparatus further includes:
    a hydraulic or electric actuator operatively connected to said friction controlled joint for selectively adjusting a friction level in said friction controlled joint; and
    a control unit operatively connected to said actuator for controlling actuation of said actuator to thereby adjust said friction level in said friction controlled joint.

4. The friction control apparatus of claim 1 wherein said friction controlled joint is a ball joint rotatably connecting said first link and said second link.

5. The friction control apparatus of claim 4 wherein said ball joint has one of uniform friction levels in all directions or varying friction levels in varying directions.

6. The friction control apparatus of claim 1 further including:
    a first link joint connecting said first end of said first link to said one of said steering knuckle or said lower control arm, wherein said first link joint is a two-dimensional joint allowing rotational movement about a first axis and translational movement along said first axis.

7. The friction control apparatus of claim 6 wherein said first axis is generally parallel to a pivot axis of a guiding joint pivotally connecting a lower part of said steering knuckle to said lower control arm.

8. The friction control apparatus of claim 6 further including:
    a second link joint connecting said first end of said second link to said other of said steering knuckle or said lower control arm, wherein said second link joint is a one dimensional joint allowing rotational movement about a second axis.

9. The friction control apparatus of claim 8 wherein said first axis is substantially parallel to said second axis.

10. The friction control apparatus of claim 8 wherein at least one of said first axis and said second axis is aligned with a vehicle longitudinal direction.

11. The friction control apparatus of claim 8 wherein said first link joint connects said first end of said first link to said lower control arm and said second link joint connects said first end of said second link to said steering knuckle.

12. The friction control apparatus of claim 11 wherein said first link joint connects said first link to said lower control arm at a location spaced apart from a guiding joint pivotally connecting a lower part of said steering knuckle to said lower control arm.

13. The friction control apparatus of claim 12 wherein said second link joint connects said second link to said steering knuckle at a location spaced apart from said guiding joint and apart from an axle shaft aperture defined by said steering knuckle.

14. The friction control apparatus of claim 1 further including:
- a first link joint connecting said first end of said first link to said one of said steering knuckle or said lower control arm; and
- a second link joint connecting said first end of said second link to said other of said steering knuckle or said lower control arm, said second link joint is a one dimensional joint allowing only rotational movement about one axis.

15. An add-on friction control apparatus for a vehicle suspension, comprising:
- a first link having one end mounted to one of an associated steering knuckle or an associated lower control arm of the steering knuckle;
- a second link having one end mounted to the other of the associated steering knuckle or the associated lower control arm;
- a friction controlled joint movably connecting ends of said first and second links to each other to control friction between the associated steering knuckle and the associated lower control arm without modifying an associated guide joint between the associated steering knuckle and the associated lower control arm.

16. The add-on friction control apparatus of claim 15 wherein said friction controlled joint has an adjustable friction level controlled by an operatively connected control unit.

17. The add-on friction control apparatus of claim 15 further including a first link joint at said one end of said first link, said first link joint limiting movement of said first link to rotational movement about a first axis and translational movement axially along said first axis.

18. The add-on friction control apparatus of claim 17 wherein said first link joint includes:
- a sleeve fixedly secured to one of the associated steering knuckle or the associated lower control arm, said sleeve coaxial with said first axis and defining an axial slot through which said first link is received; and
- a cylindrical member moveably disposed within said sleeve and fixedly secured to said one end of said first link, said cylindrical member rotatable within said sleeve about said first axis and slidable within said sleeve along said first axis, rotatable movement of said cylindrical member limited by a width of said axial slot.

19. The add-on friction control apparatus of claim 15 further including a second link joint at said one end of said second link, said second link joint limiting movement of said second link to rotational movement about a second link joint axis.

20. The add-on friction control apparatus of claim 19 wherein said second link joint includes:
- a cylindrical member fixedly secured to said one end of said second link; and
- at least one collar fixedly secured to said other of the associated steering knuckle or the associated lower control arm, said cylindrical member rotatably received in an aperture of said at least one collar for allowing rotational movement of said cylindrical member about said second link joint axis.

21. A vehicle suspension friction control apparatus, comprising:
- a first link having a first end mounted to a lower control arm of a kingpin strut assembly;
- a second link having a first end mounted to a knuckle of said kingpin strut assembly; and
- a friction controlled ball joint connecting second ends of said first and second links for adding friction between said knuckle and said lower control arm.

22. The vehicle suspension friction control apparatus of claim 21 further including:
- a first link joint connecting said first end of said first link to said lower control arm, said first link joint limiting movement of said first link relative to said lower control arm to rotational movement about a first axis generally parallel to a direction of vehicle travel and to transverse movement along said first axis; and
- a second link joint connecting said first end of said second link to said knuckle, said second link joint limiting movement of said second link relative to said knuckle to rotational movement about a second axis generally parallel to said direction of vehicle travel.

23. The vehicle suspension friction control apparatus of claim 22 wherein said ball joint has a first friction level for relative rotational movement between said first and second links and has a second friction level for relative rocking movement between said first and second links, said first friction level the same as or different from said second friction level.

* * * * *